Patented Oct. 7, 1924.

1,511,074

UNITED STATES PATENT OFFICE.

LEON W. GELLER, OF HAMBURG, NEW YORK, ASSIGNOR TO NATIONAL ANILINE & CHEMICAL COMPANY, INC., OF NEW YORK, N. Y., A CORPORATION OF NEW YORK.

PYRAZOLONE DYE.

No Drawing.  Application filed November 30, 1923. Serial No. 677,887.

*To all whom it may concern:*

Be it known that I, LEON W. GELLER, a citizen of Rumania, residing at Hamburg, in the county of Erie, State of New York, have invented certain new and useful Improvements in Pyrazolone Dyes; and I do hereby declare the following to be a full, clear, and exact description of the invention, such as will enable others skilled in the art to which it appertains to make and use the same.

This invention relates to the production of a new pyrazolone dye which is of value for dyeing wool without a mordant from an acid bath. The dyed fabric, or other material, dyed with the new dyestuff also forms a part of the present invention.

The new dyestuff can be obtained by diazotizing aniline and combining the diazo compound thus obtained with 1-(2'-chlor-5'-sulphophenyl)-3-methyl-5-pyrazolone.

The following specific example will further illustrate the invention, but it is understood that the invention is not limited thereto. The parts are by weight.

Example: 93 lbs. aniline are dissolved in 250 lbs. of 20° Bé. hydrochloric acid and 1000 lbs. water and diazotized in the usual manner at a temperature of about 0° C. by means of about 70 lbs. sodium nitrite. The diazo solution thus obtained is carefully added to a vigorously stirred solution, maintained at a temperature of about 0°-5° C., of 288 lbs. of 1-(2'-chlor-5'-sulfophenyl)-3-methyl-5 pyrazolone dissolved in 2000 lbs. water and 60 lbs. soda ash and to which there is subsequently added about 150 lbs. sodium bicarbonate. Toward the end of the combination, the diazo solution is slowly added so that there is at no time a reaction for diazobenzene when a sample is tested with R-salt. The coupling takes place substantially at once and the dye precipitates as a yellow product. When the combination is complete, the dyestuff is dissolved by heating the reaction-mass to about 50°-60° C. and the dyestuff precipitated by the addition of common salt. The dyestuff is isolated by filtering it from the warm solution, and it is then pressed and dried.

The new dyestuff thus obtained, in the form of its sodium salt, has most probably the following formula:

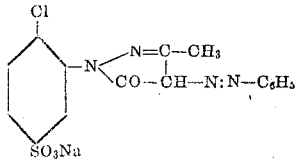

and in the dry and pulverized state is a yellow powder soluble in water giving a yellow solution, and soluble in concentrated sulfuric acid giving a yellow solution which on addition of ice gives a precipitate of a yellow color. The aqueous solution of the dye on addition of concentrated hydrochloric acid precipitates the free acid of the dyestuff in the shape of light yellow flakes, whereas the addition of aqueous ammonia to the aqueous solution produces substantially no change. The neutral aqueous solution when heated at about 80°-85° C. with zinc dust is decolorized, but by the oxidizing action of the air assumes afterward a violet color. The new dyestuff dyes wool, from an acid bath, intense yellow tints of excellent fastness to acids and to light, and does not stain cotton or artificial silk. The new dyestuff may be also used to advantage for the production of color lakes.

I claim:

1. As a new product, the dye having the probable formula—

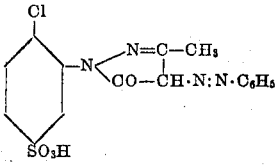

and obtainable by combining diazotized aniline with 1-(2'-chlor-5'-sulfophenyl)-3-methyl-5-pyrazolone, said dyestuff in the shape of its dry and pulverized sodium salt being a yellow powder, dissolving in water with a yellow color, the aqueous solution being scarcely altered in color by addition of aqueous ammonia, the dyestuff being precipitated as yellow flakes by the addition of hydrochloric acid, dissolving in concentrated sulfuric acid with a yellow color, and said dyestuff dyeing wool from an acid bath yellow tints fast to light and to acids.

2. Material dyed with the dyestuff of claim 1.

In testimony whereof I affix my signature.

LEON W. GELLER.